United States Patent [19]

Podell

[11] Patent Number: 4,629,131
[45] Date of Patent: Dec. 16, 1986

[54] MAGNETIC SAFETY INTERLOCK FOR A FOOD PROCESSOR UTILIZING VERTICALLY ORIENTED, QUADRANT CODED MAGNETS

[75] Inventor: Allen F. Podell, Palo Alto, Calif.

[73] Assignee: Cuisinarts, Inc., Greenwich, Conn.

[21] Appl. No.: 237,876

[22] Filed: Feb. 25, 1981

[51] Int. Cl.$^4$ ............................................... B02C 18/16
[52] U.S. Cl. ...................................... 241/36; 241/37.5; 241/92; 241/199.12; 241/282.1
[58] Field of Search ............. 241/36, 37.5, 92, 199.12, 241/282.1, 282.2

[56] References Cited

U.S. PATENT DOCUMENTS 3,957,215  5/1976  Otto .................................. 241/282.1

FOREIGN PATENT DOCUMENTS 54-7770  1/1979  Japan .................................. 241/37.5

*Primary Examiner*—Howard N. Goldberg
*Assistant Examiner*—Timothy V. Eley
*Attorney, Agent, or Firm*—Parmelee, Bollinger & Bramblett

[57] ABSTRACT

An improved safety interlock for a food processor of the type including a control system for preventing actuation of a powerful motor drive, so that the food processing tool does not rotate, unless two conditions have been met; namely, (1) a bowl is mounted in its operating position on the base housing, and
(2) a cover is held securely in its operating position on the bowl.

The improved safety interlock provided in one embodiment of the invention uses two permanent magnets. One magnet is associated with actuator means and the other magnet is associated with switch means which prevent operation of the motor unless actuated. These two magnets are oriented generally in vertical planes relative to the horizontal top deck of the base housing. Each magnet is divided or coded into respective polarity quadrants, said quadrants of each of these magnets being non-symmetrical with respect to mutually perpendicular axes. The two magnets are arranged so that the control for the motor drive of the food processor can only be magnetically actuated when both the bowl and the cover are mounted securely in their respective predetermined operating positions.

19 Claims, 7 Drawing Figures

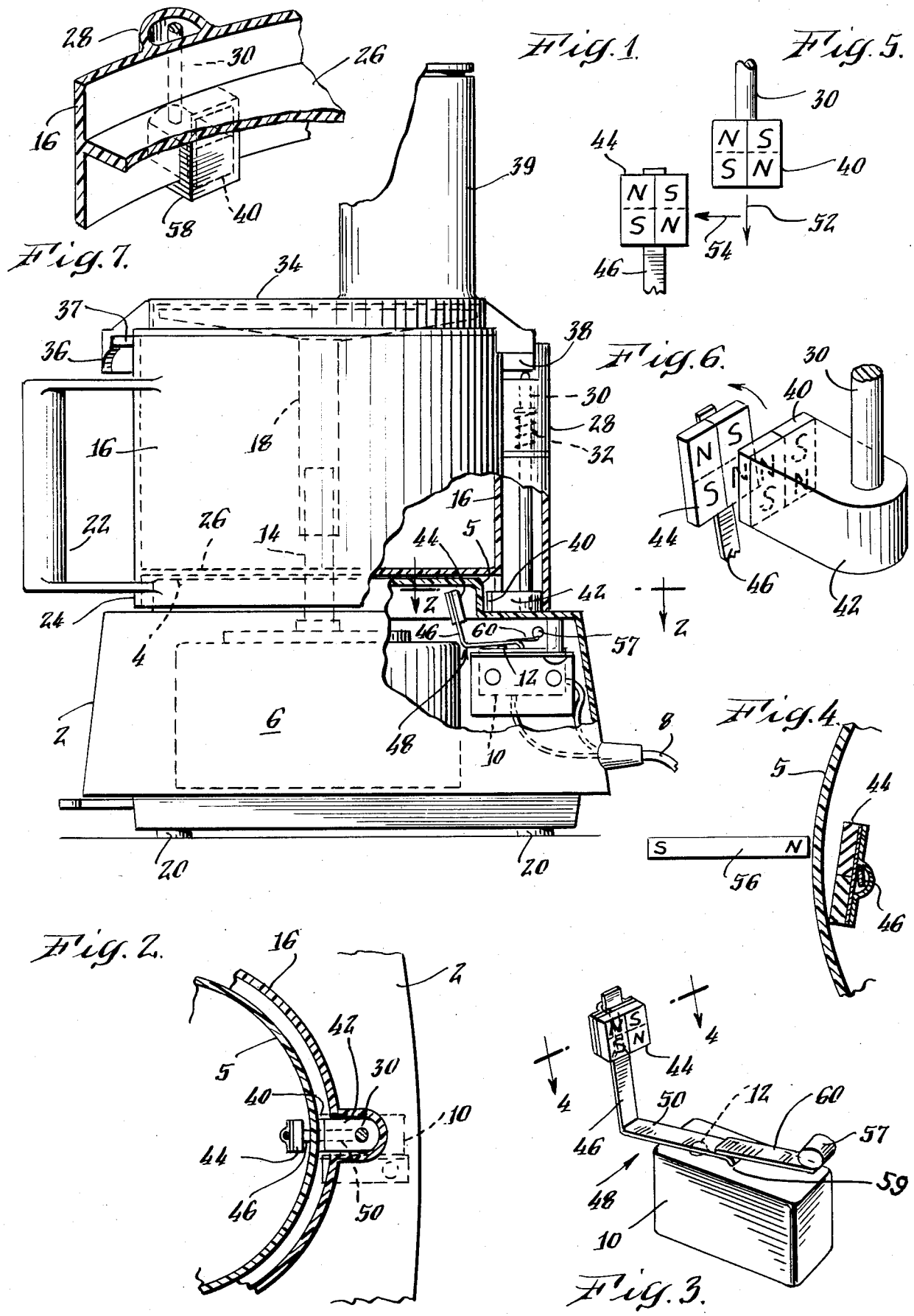

MAGNETIC SAFETY INTERLOCK FOR A FOOD PROCESSOR UTILIZING VERTICALLY ORIENTED, QUADRANT CODED MAGNETS

FIELD OF THE INVENTION

The present invention relates to apparatus for preparing and processing food, and in particular, to the multipurpose kitchen apparatus called food processors in which a plurality of interchangeable rotary food prepafing tools are removably mounted on a tool drive in a bowl, including a variety of tools, such as cutting discs, blades, sliding discs, rasping discs, griding or chopping blades, etc, which are used for performing the operations of cutting, slicing, rasping, grating, pureeing, etc., of food items.

BACKGROUND OF THE INVENTION

There are food processors of the type broadly set forth above having a working bowl or vessel with a motor driven shaft projecting vertically upwards through the bottom of the bowl on which various selected rotary tools can be engaged to be driven by the shaft for performing various food processing operations as may be desired by the user. A detachable cover is secured over the top of the bowl during use. This cover includes a hopper or feed tube which has a mouth that opens downwardly through the cover into the top of the bowl. The food items to be prepared are placed in this feed tube and then are manually pushed down through the feed tube into the bowl by means of a removable pusher member which is adapted to slide down in the manner of a plunger into this feed tube. For further information about this type of food preparing apparatus, the reader may refer to U.S. Pats. Nos. 3,985,304-Sontheimer and 4,216,917-Clare et al, 4,198,887-Williams, and 4,227,655-Williams.

The rotary tools in food processors are being driven by relatively powerful motor drive arrangements and have the capability of causing injury. For this reason, a bowl-cover safety feature is conventionally incorporated into these units. This feature requires that the cover be firmly locked onto the bowl in normal position before the motor will start. This requirement is achieved by making the cover, which locks rotationally to the bowl, with a projection or member which causes the closing of a switch carried in the housing only when the cover is properly locked into its normal position on the bowl. Depending upon the type of food processor, this cover projection may actuate the switch directly or through an intermediate linkage.

U.S. patent application Ser. No. 155,200, filed June 2, 1980, by Sontheimer et al entitled "Magnetic Safety Interlock Method and Apparatus for Food Processor" discloses a safety interlock in which the motor drive can only be actuated by an appropriately coded magnet. The embodiment disclosed in FIGS. 13-17 of the patent application illustrate the use of two striped permanent magnets both of which are orientated in a horizontal direction with respect to the base housing. Each of the magnets comprises adjacent magnetic stripes of alternating magnetic polarity which extend widthwise across the respective magnets.

SUMMARY OF THE INVENTION

It is an object of the present invention to provide an improved magnetic safety interlock for a food processor in which a pair of permanent magnets orientated in a generally vertical direction are each subdivided into identically coded magnetic quadrants in which the polarities of each of the magnets are non-symmetrical with respect to mutually perpendicular axis, and the magnets are so arranged on the food processor so that its motor drive will be actuated magnetically only when both the bowl and cover are locked securely in their respective operative positions. Other objects, features and advantages of this invention will become apparent from a consideration of the following description in conjunction with the drawings.

The invention is an improvement in an automatic food processor of the type including a base enclosing a motor drive, a work bowl removably mountable on the base, a drive shaft extending from the motor drive and into the work bowl for receiving rotable tools removably installed thereon, and a cover for the work bowl having a hopper extending therethrough and a food pusher insertable into the hopper for advancing food into the work bowl against the action of a rotatable food processing tool. The improvement provided to the food processor includes a magnetic safety interlock using true permanent magnets orientated in a vertical direction Each of the magnets is identically coded into magnetic quadrants arranged so that the polarities of each magnet are non-symmetrical to mutually perpendicular axis. The magnets are arranged to be in alignment to actuate the motor drive of the food processor only when the work bowl is in a predetermined operative position securely locked on the base, and the cover is in a predetermined operative position securely locked on the bowl. The non-symmetrical quadrant polarity coding of the magnets prevents inadvertent or accidental actuation of the motor drive by external magnetic influences because actuation can occur only when the two magnets of the food processor are in substantially exact alignment with each other in opposed, closely spaced, parallel relationship.

BRIEF DESCRIPTION OF THE DRAWINGS

FIG. 1 is a side elevational view of a food processor incorporating the preferred embodiment of the invention, a portion thereof being broken away to illustrate its internal construction.

FIG. 2 is a partial plan view of the food processor of FIG. 1 as seen in the direction of the directional arrows 2—2 of FIG. 1.

FIG. 3 is a perspective view of a non-symmetrical quadrant coded permanent magnetic mounted to one leg of an L shaped bracket that is operatively associated with a spring biased push button switch in accordance with the present invention.

FIG. 4 is a partial top plan view of the permanent magnet taken along directional arrows 4—4 of FIG. 3 illustrating that the permanent magnet is pivotally mounted on the leg of its supporting bracket. FIG. 4 further illustrates that the permanent magnet will pivot in response to an external magnet influence such as the shown bar magnet.

FIG. 5 is a diagrammatic illustration of relative movement between a first quadrant coded "actuator" magnetic and an identical second quadrant coded "switch" magnet in accordance with the present invention.

FIG. 6 is a perspective view showing the "actuator" magnet of FIG. 5 in alignment with the "switch" magnet of FIG. 3. The "switch" magnetic and its supporting bracket are repulsed by the "actuator" magnet when aligned therewith.

FIG. 7 is a perspective view of a section of the food processor of FIG. 1 illustrating an embodiment of the invention in which the actuator magnet is enclosed within a protective non-magnetic enclosure.

DESCRIPTION OF THE PREFERRED EMBODIMENTS

With particular reference to FIG. 1 of the drawings, there is shown a food processor comprising a base housing 2 having a raised platform or turret 4 with a sidewall 5 extending upwardly from the top of the base housing. Enclosed within the base housing is a power source in the form of a relatively powerful electric motor 6 which is energized by a power cord 8 via a switch 10 having a vertically reinforced upwardly spring biased actuating button 12. As more fully shown in the Verdun U.S. Pat. No. 3,892,365, a vertical drive shaft, designated herein by the reference numeral 14, extends upwardly from the base housing and into a work bowl 16 through suitable aligned openings provided in the top surface of the base and the bottom of the work bowl. A plurality of food processing tools, such as the one shown by numeral 18, are provided and can be selectively removably mounted on the drive shaft for rotation within the work bowl. The lower surface of the base may be provided with conventional supporting or suction members 20 formed from a suitable material such as rubber.

The work bowl 16 includes a handle 22 and a skirt 24 extending downwardly from the periphery of its lower surface 26. The bowl is removably mountable to the base with the lower surface of the bowl and its downwardly extending skirt fitting on the upper surface and sidewalls of the turret 4, respectively. The work bowl is rotatable on the turret, and conventional locking means (not shown), as for example lateral tenons on the base which engage corresponding notches on the skirt of the bowl, can be provided to lock the bowl securely on the base. (See the aforementioned U.S. patent application Ser. No. 155,200 for an illustration of this locking feature.)

Formed on the side of the bowl 16 is a vertical semi-cylindrical boss 28 defining a guideway within which is carried a vertically movable operating rod 30 which is normally spring biased upwardly by a spring 32. When the bowl is locked on the base in its operative position, as illustrated in FIG. 1, the operating rod is substantially aligned above the switch 10.

The top of bowl 16 is closed by a cover 34 which is arranged to be engaged in locked relationship in its normal position on the bowl 16 whenever the food processor is in operation as illustrated in FIG. 1. For example, the cover may be held in locked engagement with the bowl by placing the cover onto the rim of the bowl and then giving the cover a partial turn to obtain a twist-lock effect. For this locking engagement the cover may for example, carry a plurality of circumferentially located depending lugs 36 which, upon rotation of the cover 34, engage beneath cooperating radial ledges 37 on the bowl 16 near its rim. The cover may be secured in place by clamping means or by any other manually engageable means. It is to be understood that there are numerous ways and means by which such a cover 34 may be held in locked engagement upon the working bowl 16 during operation of the food processor. A food hopper 39 extends upwardly from an opening on the cover 34.

The cover 34 is provided with a camming surface or cam 38 which depresses the operating rod 30 when the cover is secured or locked in proper operating position on the work bowl as is illustrated in FIG. 1. Alternatively, the cover can be provided with two cams diametrically on opposite sides.

The apparatus thus far described, except for the above mentioned doubled camming surface, is conventional and illustrated in the aforementioned Clare et al. patent. The improved magnetic safety interlock provided by the present invention will now be discussed in detail with reference to FIGS. 1–7.

As illustrated in FIG. 1, a first permanent magnet 40 is carried on the end of a supporting member 42 which itself is mounted to the lower portion of the operating rod 30 and vertically movable therewith. The first magnet is vertically orientated relative to the horizontal upper surface of the base, as will be discussed in further detail below. When the bowl is securely locked to the base in its operative position, and the cover is securely locked on the bowl in its operative position, the cam 38 carried on the periphery of the cover 34 depresses the operating rod 30, as shown in FIG. 1. In this operating position, the first magnet 40 is in alignment and faces directly a second permanent magnet 44 which is movably mounted within the base and also vertically orientated relative to the upper surface of the base. The aligned magnets, which are identically magnetically coded, as will be discussed below, produce a strong repulsive magnetic force acting upon each other. The magnet 40 will be referred to as an actuator magnet while the magnet 44 will be referred to as a switch magnet.

It is appropriate at this point in the description to more fully describe the actuator and switch magnets. Both of these magnets are generally square and subdivided into four quadrants of magnetic polarity as illustrated in FIGS. 3, 5, and 6. The two magnets are identical to each other and each have their four magnetic quadrants arranged or magnetically coded so that their polarities are non-symmetrical to mutually perpendicular axis. Of course, the polarities of each magnet can be interchanged from the coding pattern shown in the drawings and the requirement of non-symmetry with respect to mutually perpendicular axis will still be satisfied. Thus, the specific coding pattern shown in the drawings is clearly presented only for illustrative purposes. In any event, the magnetic coding of the two identically coded opposed magnets, both of which are orientated in a vertical direction, assures that only exact alignment of the magnets, in both a horizontal and vertical direction, can provide a repulsive magnetic force sufficient to actuate the food processor, as will be discussed below. That is, the non-symmetrical arrangement of the coding of the magnetic quadrants assures that a necessary repulsive magnet force will not be produced unless there is exact alignment of the magnets, and thus exact alignment and registration of each of the like poles of each quadrant of the two magnets. The magnets themselves can be formed from soft rubber or ceramic and are preferably approximately ⅛ inch in thickness.

Referring back to FIG. 1, when the food processor work bowl and cover are in their respective operative positions the cam 38 on the work bowl depresses the operating rod 30 to move the actuator magnet 40 downwardly on the sidewall of the turret 4 and into alignment with the switch magnet 44 which is immediately adjacent to the inner sidewall of the turret. The like poles of each quadrant on each magnet are therefore directly aligned with each other, and the switch magnet 44, which is repulsed by the resultant magnetic forces, is caused to move inwardly away from the inner sidewall of the turret, as shown in FIG. 1. Prior to the alignment of the actuator magnet with the switch magnet, the switch magnet is located adjacent to the inner sidewall of the turret.

It is noted, of course, that the sidewall of the turret must be formed from a non-magnetic material, as for example, a plastic. Plastics are permeable to magnetic flux.

The switch magnet 44 is mounted to the shorter upright leg 46 of an "L" shaped switch arm 48. As illustrated in FIGS. 1 and 2, but more clearly shown in FIG. 3, the longer horizontal leg 50 of the "L" shaped arm 48 is pivotally mounted at 59 (FIG. 3) on the top of the switch 10 and extends over the upwardly spring-biased switch actuator button 12. When the actuator magnet is not aligned with the switch magnet, then the spring-biased actuator button lifts the switch arm 48 upwardly and thereby holds the switch magnet (mounted to the smaller leg of this arm) adjacent to the inner surface of the sidewall of the turret. Thus, the switch 10 is not actuated and the motor drive means will not operate.

However, when the actuator magnet is adjacent to the outer surface of the sidewall of the turret 4 and in alignment with the switch magnet, then the resultant repulsive magnetic forces, as discussed above, force the switch magnet and the smaller leg of the "L" shaped arm 48 backward away from the turret sidewall, forcing the longer leg of this arm to depress the switch actuator button 12 and thereby energize the motor drive to render the food processor operative. In effect, the pivotally mounted "L" shaped arm acts as a lever to depress the switch actuator button.

The switch and actuator magnets used in the food processor are chosen so that the repulsive magnetic force generated by the magnets when their segments of like polarity are aligned is sufficient to overcome the opposing resilient force of the upwardly spring-biased switch actuator button. FIG. 3 illustrates a perspective view of the pivotally mounted L shaped arm 48 depressing the switch actuator button 12 when the food processor is operative as shown in FIG. 1. Switch 10 is of the conventional type in which the switch is open when the actuator button is biased upwardly and the switch is closed when the actuator button is depressed.

When the actuator magnet 40 is moved out of alignment with the switch magnet 44, as for example by rotating or removing the cover 34 from the top of the bowl 16 or by rotating or removing the bowl 16 from the base 2, the repulsive magnetic forces between the magnets are substantially eliminated and the upwardly directed resilient force of the actuator button of the switch is dominant. The actuator button springs upwardly forcing the longer leg of the switch arm 48 upwardly. The switch is open in this position to render the motor drive inoperative. The resilient force of the actuator button on the arm 48 maintains the switch magnet 44 adjacent to the inner surface of the sidewall 5 of the turret, except when the actuator magnet 40 is brought into alignment with the switch magnet 44.

FIG. 5 of the drawings illustrates, in diagram form, the relative movement of the actuator magnet 40 with respect to the switch magnet 44. As discussed above, the actuator magnet is vertically movable with the operating rod 30 in the downward direction of arrow 52 (FIG. 5) when the cover is securely seated in its operative position on the work bowl. The actuator magnet is laterally movable in the direction of arrow 54 of FIG. 5 as the work bowl is being rotated into its operative position with respect to the base 2 and turret 4. When both the cover and work bowl are in their respective operative positions, then the two magnets become aligned. As was discussed before, the identical non-symmetric quadrant coding of each of the magnets assures that a repulsive magnetic force of sufficient magnitude to cause the switch magnet to actuate the switch will result only if the two magnets are exactly aligned in both horizontal and vertical directions.

FIG. 6 is a perspective view of the actuator magnet and the switch magnet in alignment. The individual polarity quadrants of each magnet are aligned to effect the repulsive magnetic force. The two magnets are in opposed relationship to each other and are both orientated vertically in closely spaced parallel planes. The repulsive force between the two aligned opposed magnets forces the switch magnet rearwardly and thereby causes its supporting arm to pivot downwardly to depress the switch actuator button as discussed above. Although the same repulsive force acts upon the actuator magnet, there is no substantial rearward movement of the magnet, because its supporting operating rod 30 is maintained in position by its enclosing boss 28 which prevents lateral movement of the operating rod. It is apparent from FIG. 6 that the non-symmetric magnetic coding of the two magnets is such that even if the magnets are only one quadrant out of alignment, in either a vertical or horizontal direction, then resultant magnetic forces are attractive (not repulsive) and, accordingly, the switch 10 will not be actuated.

FIG. 4 illustrates a further feature of the new magnetic safety interlock device. As discussed above, the identical non-symmetric magnetic quadrant coding of each of the actuator and switch magnets is provided to assure that the food processor will not be operative unless the two identically coded magnets are in alignment. As a further safety feature, the switch magnet is mounted to the shorter leg 46 of its supporting "L" shaped arm 48 such that the switch magnet is, within a limited range, able to pivot about the vertical axis of the leg 46. The pivot range of the switch magnet relative to its support leg is in the range of ±10° to ±30°. Pivotal mounting of the switch magnet on its supporting leg prevents inadvertent or accidental actuation of the food processor by external magnetic sources, as for example, a bar magnet 56 illustrated in FIG. 4.

Because the bar magnet does not correspond to the magnet coding of the switch magnet, the switch magnet pivots as shown and does not depress the switch arm. Thus, advantageously, it is unlikely that any bar magnet could produce a repulsive force of sufficient strength to fully depress the switch arm to actuate the food processor. In any event, any magnetic influence resultant from the bar magnet tends to cause pivotal movement (not arm depressing movement) of the switch magnet.

When the actuator magnet is aligned in opposed relationship with the switch magnet, the repulsive forces are balanced about the pivot axis 46, thus the switch magnet as a whole is repulsed instead of merely being pivoted. Consequently, the arm 48 swings down fully to activate the switch 10 for allowing operation of the food processor drive.

The actuator magnet 40 is slidable along the outer surface of the sidewall 5 of the turret 4 when the actuator magnet is moved vertically between its upper, non-operative position and its lower, operative position (see FIGS. 1 and 2). Because the downwardly extending skirt 24 of the work bowl 16 is rotatable along the outer sidewall of the turret 4, the skirt tends to scrape and thereby remove any material that might accumulate on the outer sidewall of the turret, thus maintaining the outer sidewall clean. The clean sidewall assures optimum magnetic conductivity between the switch magnetic on the inner sidewall and the actuator magnetic adjacent the outer sidewall. Any dirt or debris that might otherwise accumulate on the outer sidewall of the turret and interfere with the magnetic conduction is intrinsically removed by the rotatable skirt of the work bowl.

To further protect the actuator magnetic, the actuator magnetic may be coated with a thin protective film of non-magnetic plastic. Alternatively, as illustrated in FIG. 7, a thin walled enclosure 58, formed from non-magnetic plastic, is provided immediately adjacent to the sidewall of the turret 4 and across the top surface of the base beneath the boss 28. The thin walled enclosure minimizes the length of the flux path between the actuator and switch magnets and protects the actuator magnet. The flux path will then extend through the thin walled non-magnetic plastic and through the sidewall of the turret. The thin walled plastic enclosure can be blackened or opaqued to conceal the actuator magnet 40 from view.

As shown in FIGS. 1 and 3, there is a counterbalance 57 mounted on a horizontal extension 60 of the switch arm. This extension 60 is on the opposite side of the pivot 59 from location of the magnet 44. This counterbalance 57 has a mass sufficient to counterbalance the effect of the mass of the magnet 44 for preventing momentary actuation of the switch 10 if the base 2 is bumped downwardly against a counter top.

It is believed that the many advantages of this invention and the manner in which it fulfills the stated safety objectives will be understood by those skilled in the art. It will also be understood that a number of variations and modifications may be made in the illustrative embodiments of the invention without departing from its spirit and scope. Accordingly, the foregoing description is to be construed as illustrative only, rather than limiting. This invention is limited only by the scope of the following claims and all equivalents thereto.

I claim:

1. In a food processor of the type including tool drive means located in a base with control means for rendering the tool drive means inoperative unless said control means are actuated, said base having a turret shaped platform extending from its upper surface, a bowl having a downwardly extending skirt mountable on said base and rotatable relative to said turret, a removable cover rotatably mountable atop said bowl, a movable element mounted on said bowl and spring biased away from said base when said bowl is mounted on said base, means on said cover for driving said movable element towards said base when said cover is in a predetermined position relative to said bowl, the improvement comprising a safety interlock apparatus including:

a first permanent magnet mounted to said movable element and movable therewith, said first permanent magnet having a plurality of North polarized magnetic pole faces and a plurality of South polarized magnetic pole faces, all of said pole faces being oriented in the same plane perpendicular to the upper surface of said base, a second permanent magnet movably mounted within said base and coupled to said control means, said second permanent magnet having a second plurality of North polarized magnetic pole faces and havng a second plurality of South polarized magnetic all of said pole faces being oriented in a plane parallel to and closely spaced from the plane of orientation of said first permanent magnet, each of said first and second permanent magnets having predetermined identical non-symmetrical pattern of said North and South polarized magnetic pole faces, each said pattern being non-symmetrical about mutually perpendicular axes in its respective plane such that said second permanent magnet is movable to actuate said control means by magnetic forces between said first and second permanent magnets only when said first permanent magnet is moved into alignment vertically and into registration laterally with said second magnet, said first permanent magnet being mounted to said movable element such that said first permanent magnet is moved into alignment vertically with said second permanent magnet by said movable element only when said cover is in said predetermined position relative to said bowl and said first magnet is moved into registration laterally with said second magnet only when said bowl is rotated into a second predetermined position relative to said base, whereby said control means are actuated only when said cover is in a first predetermined position relative to said bowl and said bowl is in a second predetermined position relative to said base.

2. A food processor as claimed in claim 1 wherein said control means includes a switch having an outwardly biased push button, said switch being closed only when said push button is depressed, and an L shaped bracket carrying said second permanent magnetic mounted to one leg thereof, the other leg thereof movably mounted on said switch and so positioned such that movement of said bracket, as a result of the magnetic forces between said first and second permanent magnets, causes said other leg of said bracket to depress said push button and close said switch.

3. A food processor as claimed in claim 2 wherein said second permanent magnet is mounted to the smaller leg of said L shaped bracket.

4. A food processor as claimed in claim 3 wherein said second permanent magnetic is movably mounted to said smaller leg of said L shaped bracket along a plane perpendicular to said smaller leg.

5. A food processor as claimed in claim 4 wherein said second permanent magnetic is mounted to said smaller leg of said L shaped bracket such that movement of said second permanent magnetic relative to said smaller leg is limited.

6. A food processor as claimed in claim 5 wherein said second permanent magnetic is movable relative to said smaller leg of said L shaped bracket within a range of ±10° to ±30°.

7. A food processor as claimed in claim 5 wherein said movement of said second permanent magnet relative to said smaller leg of said L shaped bracket prevents movement of said smaller leg a distance sufficient to actuate said switch as a result of magnetic influences other than those resultant from substantially exact alignment of said first permanent magnet with said second permanent magnet.

8. A food processor as claimed in claim 1 wherein said bowl is mounted to said base and said movable element is mounted relative to said bowl such that said first permanent magnet mounted to said movable element is adjacent to the outer sidewall of said turret when said cover is in said predetermined position relative to said bowl.

9. A food processor as claimed in claim 8 wherein said second permanent magnetic is positioned adjacent to the inner sidewall of said turret when said first permanent magnet is not in alignment therewith.

10. A food processor as claimed in claim 1 wherein each of said first and second permanent magnets is identically magnetically coded in a quadrant format in which the poles of the quadrants of each magnet are non-symmetrical with respect to mutually perpendicular axis.

11. A food processor as claimed in claim 10 wherein said first and second permanent magnets are relatively orientated so that the like poles of each quadrant of each magnet are in alignment with each other when said magnets are in alignment.

12. A food processor as claimed in claim 11 wherein each of said first and second magnets is formed from rubber.

13. A food processor as claimed in claim 11 wherein each of said first and second magnets is formed from ceramic.

14. A food processor as claimed in claim 1 wherein said first permanent magnet on said movable element is movable along the outer vertical sidewall of said turret when said bowl is rotated on said base.

15. A food processor as claimed in claim 14 wherein said first permanent magnetic is coated with a thin protective coating of a non-magnetic material.

16. A food processor as claimed in claim 15 wherein said non-magnetic material is plastic.

17. In a food processor of the type including tool drive means located in a base with control means for rendering the tool drive means inoperative unless said control means is actuated, said base having a turret shaped platform extending from its upper surface, a bowl having a downwardly extending skirt mountable on said base and rotatable relative to said turret, a removable cover rotatably mountable atop said bowl, a movable element mounted on said bowl and spring biased away from said base when said bowl is mounted on said base, means on said cover for driving said movable element towards said base when said cover is in a predetermined position relative to said bowl, the improvement comprising a safety interlock apparatus including:
a first permanent magnet mounted to said movable element and movable therewith, said first permanent magnet having a plurality of North polarized magnetic pole faces and a plurality of South polarized magnetic pole faces, all of said pole faces being oriented in a vertical plane perpendicular to the upper surface of said base,
a second permanent magnet movably mounted within said base and coupled to said control means, said second permanent magnet having a second plurality of North polarized magnetic pole faces and having a second plurality of South polarized magnetic pole faces all of said pole faces being oriented in a second vertical plane parallel to and closely spaced from the plane of orientation of said first permanent magnet,
each of said first and second permanent magnets having said pole faces arranged in predetermined identical magnetic codes in non-symmetrical quadrant format, said quadrant format being non-symmetrical with respect to mutually perpendicular axes located in the respective vertical plane of orientation of said pole faces such that said second permanent magnet is movable to actuate said control means by the magnetic force between said first and second permanent magnets only when said first permanent magnet is moved into alignment vertically and into registration laterally with said second magnet,
said first permanent magnet being mounted to said movable element such that said first permanent magnet is moved into alignment vertically with said second permanent magnet by said movable element only when said cover is in said predetermined position relative to said bowl and said first magnet is moved into registration laterally with said second magnet only when said bowl is rotated into a second predetermined position relative to said base,
whereby said control means are actuated only when said cover is in a first predetermined position relative to said bowl and said bowl is in a second predetermined position relative to said base.

18. In a food processor of the type including tool drive means located in a base with control means for rendering the tool drive means inoperative unless said control means are actuated, said base having a turret shaped platform extending from its upper surface, a bowl having a downwardly extending skirt mountable on said base and rotatable relative to said turret, a removable cover rotatably mountable atop said bowl, a movable element mounted on said bowl and spring biased away from said base when said bowl is mounted on said base, means on said cover for driving said movable element towards said base when said cover is in a predetermined position relative to said bowl, the improvement comprising a safety interlock apparatus including:
a first permanent magnet mounted to said movable element and movable therewith, said first permanent magnet being oriented in a plane perpendicular to the upper surface of said base,
a second permanent magnet movably mounted within said base and coupled to said control means, said second permanent magnet being oriented in a plane parallel to the plane of orientation of said first permanent magnet,
each of said first and second permanent magnets having predetermined identical magnetic codes such that said second permanent magnet is movable to actuate said control means by magnetic forces between said first and second permanent magnets only when said first permanent magnet is moved into alignment and registration with said second magnet, and a counterbalance coupled to and extending from said second permanent magnetic, said counterbalance being of sufficient weight to prevent momentary actuation of said control means resulting from momentary impact on the food processor when said first and second permanent magnetics are not in alignment, the weight of said counterbalance not being great enough to prevent actuation of said control means when said first and second permanent magnets are in alignment.

19. A food processor as claimed in claim 18 wherein said control means includes a switch having an outwardly biased push button, said switch being closed only when said push button is depressed, and an L shaped bracket carrying said second permanent magnetic mounted to one leg thereof, the other leg thereof movably mounted on said switch and so positioned such that movement of said bracket, as a result of the magnetic forces between said first and second permanent magnets, causes said other leg of said bracket to depress said push button and close said switch, said counterbalance being mounted to the end of said other leg of said L shaped bracket opposite said second permanent magnet.

* * * * *